Nov. 5, 1968   R. E. STENGER   3,408,812
COOLED JOINT CONSTRUCTION FOR COMBUSTION WALL MEANS
Filed Feb. 24, 1967
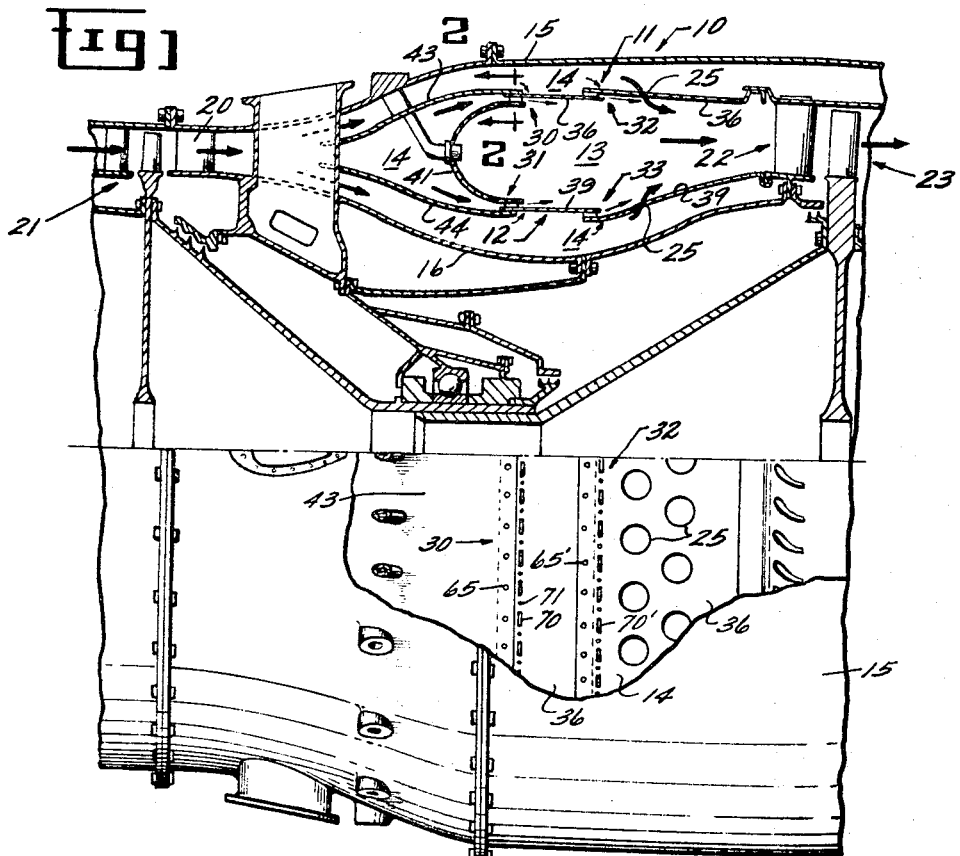
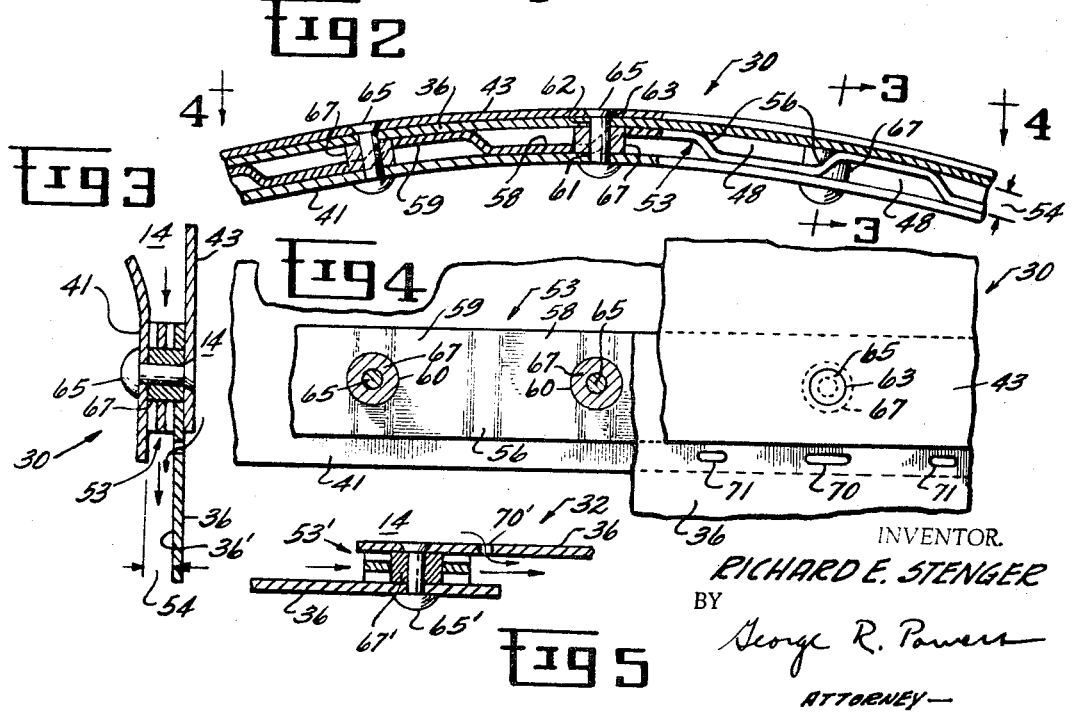
INVENTOR.
RICHARD E. STENGER
BY
George R. Powers
ATTORNEY United States Patent Office 3,408,812
Patented Nov. 5, 1968

3,408,812
COOLED JOINT CONSTRUCTION FOR COMBUSTION WALL MEANS
Richard E. Stenger, Cincinnati, Ohio, assignor to General Electric Company, a corporation of New York
Filed Feb. 24, 1967, Ser. No. 618,455
8 Claims. (Cl. 60—39.65)

ABSTRACT OF THE DISCLOSURE

A combustion wall or liner includes a joint construction in which overlapping wall members are maintained in spaced relationship by a corrugated spacer, a cooling air passage being formed between the wall members through which air can flow from an air space on one side of the wall to a combustion space on the opposite side of the wall.

---

This invention relates to an improved joint construction for a combustion liner or wall and, more particularly, to a cooled joint construction in which the elements forming the liner are arranged to permit cooling air to flow through the joint and along the liner such that a substantially uniform temperature distribution is maintained on the liner downstream of the joint. Furthermore, the cooled joint of this invention is constructed such that its elements may be easily disassembled and reassembled.

In the combustion apparatus of gas turbine engines, the actual combustion occurs within a combustion zone or space defined by a combustion liner or wall. Combustion liners are normally of perforated construction for permitting large quantities of air to flow therethrough to the combustion space to support the combustion process and to dilute the combustion products to provide a desired turbine temperature, the liner separating the combustion space from an air space continually supplied with pressurized, relatively cool air by the engine compressor. To attain reasonably satisfactory performance and operating life, it is essential that the combustion liner be protected from the high temperature and highly corrosive products of combustion. For this purpose, combustion liners are typically provided with louvered joints constructed and arranged to extract relatively small quantities of air from the air space and to direct the extracted air into the combustion space such that it forms thin, insulating layers of cool air on the surface of the liner. These thin films not only protect the liner from direct contact with the high temperature gases, but also remove radiated heat through convective contact with the liner. Ideally, these films of cooling air provide sufficient, but not excessive, quantities of cooling air and substantially uniform protection. In practice, however, the flow patterns normally existing within the combustion space and other combustion variables make it virtually impossible to provide uniform protection, and certain thermal gradients and accompanying stresses are to be expected in even the most effectively cooled liner.

The thermal conditions present in the combustion apparatus of a gas turbine engine can thus cause the eventual failure of an effectively cooled liner, the most common causes of failure being liner distortion due to thermal gradients and thermal fatigue due to repeated heating and cooling of the liner. Thermal fatigue leads to cracking and eventual failure at the liner perforations and louvers. In an effectively cooled liner, these failures will, of course, occur only after long periods of operation and are for the most part localized in nature. To avoid the necessity of replacing an entire liner because of a localized failure, it is desirable that the liner be fabricated such that the elements can be easily disassembled, the defective part repaired or replaced, and the elements then reassembled into the complete assembly. Rivets or similar mechanical fastening means are, of course, ideal for permitting easy disassembly and reassembly, but experience has disclosed that the use of such devices typically leads to a less effectively cooled liner and, hence, reduced operating life. The reason for this is that the fastening means typically interfere with air flow through the cooling joints, causing wakes and nonuniformities in the cooling air film and increased thermal gradients and stresses in the liner.

It is therefore an object of this invention to provide in combustion apparatus an improved liner or wall which can be easily disassembled for repair or replacement of defective elements.

Another object of this invention is to provide for combustion apparatus an easily disassembled combustion liner arranged and constructed such that highly effective cooling is attained during operation.

Yet another object is to provide a combustion wall or liner in which the fastening means used to hold the liner elements in position do not interfere to an excessive extent with cooling air flow through joints between the elements.

A still further object is to provide an improved combustion wall or liner which is characterized by simple and low cost construction and maintenance in combination with long and reliable operation.

Briefly stated, in carrying out the invention in one form, a combustion liner or wall is comprised of a number of components which cooperate to form a joint through which cooling air is supplied to film cool the high temperature side of the liner. In construction, the joint is formed of first and second overlapping wall members and spacing means between the overlapped portions to maintain the wall members in spaced-apart relationship, the elements forming a cooling air passage communicating at its upstream end with an air space on one side of the liner and at its downstream end with a high temperature, combustion space on the other side. To secure the elements into an integral structure, fastening members such as removable rivets extend across the passage, and the fastening means are positioned relative to the spacing means to provide minimum interference to air flow through the passage. As a result, wake formation and nonuniformities in the cooling air film are maintained at a low level, and the creation of substantial thermal gradients and stresses are thus prevented. To further reduce these thermal gradients and stresses, additional cooling air holes are provided in the liner downstream of the joint to introduce additional cooling air into the cooling air film in the regions in which wakes and nonuniformities are generated by obstructions in the air stream.

By a further aspect of the invention, the overlapped portions of the wall members are of generally cylindrical configuration and the cooling air passage through the joint is of annular cross-section. The spacing means is a continuous corrugated strip and, as such, includes circumferentially spaced-apart portions which project across the passage in a generally radial direction to provide the desired radial spacing between the wall members. These portions, as the radial fastening means, necessarily cause nonuniformities in the air flow through the passage. To maintain the nonuniformities and wake formations at a low level, the spacing portions are circumferentially aligned with respective ones of the fastening means in order to minimize the number of wake producing obstructions in the air stream.

While the novel features of this invention are set forth with particularity in the appended claims, the invention, both as to organization and content, will be better understood and appreciated, along with other objects and features thereof, from the following detailed description when taken in conjunction with the drawing, in which:

FIG. 1 is a partial cross-sectional view of the combustion apparatus of a gas turbine engine, the combustion apparatus including combustion wall means utilizing the joint construction of this invention;

FIG. 2 is an enlarged view, partially in cross-section, of the one of the joint constructions of FIG. 1, the view being taken along viewing lines 2—2 of FIG. 1;

FIG. 3 is a cross-sectional view taken along viewing line 3—3 of FIG. 2;

FIG. 4 is a view, partially cut-away, taken along viewing line 4—4 of FIG. 2, FIGS. 2-4 being aligned to illustrate the relationships between the elements; and FIG. 5 is an enlarged cross-sectional view similar to FIG. 3 of another one of the joint constructions of FIG. 1.

Referring first to FIG. 1, a portion of a gas turbine engine 10 is illustrated in cross-section, the engine 10 including a combustor 11 having a liner or combustion wall means 12 for defining an annular combustion zone or space 13 within an annular air space 14. The air space 14, which is formed between the engine casing 15 and an inner casing 16, communicates with the discharge portion 20 of an axial flow compressor 21, and the combustion space 13 communicates at its downstream end with the inlet portion 22 of a turbine 23. The combustion wall means 12 has perforations or openings 25 therein for admitting relatively large quantities of compressed air from the air space 14 to the combustion space 13 to support combustion and dilute the products of combustion. The compressor 21, the air space 14, the combustion space 13, and the turbine 23 are thus interconnected in serial flow arrangement, the direction of fluid flow being as indicated by the large arrows in FIG. 1.

As indicated previously, it is essential that the combustion wall means 12 be protected from the high temperature and highly corrosive products of combustion within the combustion space 13. To provide this necessary cooling in a highly effective manner, and at the same time permit easy disassembly and reassembly, the combustion wall means 12 is forward of a number of elements arranged such that unique joints 30, 31, 32, and 33 are provided for the passage of cooling air from the air space 14 into the combustion space 13.

Still referring to FIG. 1, the combustion wall means 12 is comprised of an outer wall formed of overlapping wall members 36, an inner wall formed of overlapping wall members 39, an annular dome 41 having downstream ends disposed in overlapped relationship with the upstream portions of the inner and outer walls, and cowls 43 and 44 projecting upstream from the inner and outer walls and the dome 41 into the air space 14. These combustion wall elements are arranged such that the joints 30, 31, 32, and 33 formed thereby include annular passages through which relatively cool air from the air space 14 can flow as indicated by the small arrows of FIG. 1 and the arrows of FIGS. 3 and 5.

Turning now to FIGS. 1-4, the construction of the joint 30 will be described in detail. As illustrated, the downstream portion of the dome 41 is overlapped by the upstream portion of the first wall members 36, the overlapped portions being of generally cylindrical configuration. A corrugated spacer 53 is disposed between the overlapped portions to maintain a small radial spacing 54 therebetween and thereby form the annular passage 48 through which cooling air can flow axially from the portion of the air space 14 between the cowls 43 and 44 and be discharged along the surface 36' to cool the wall member 36. As indicated previously, for effective cooling, this air flow through the annular passage 48 should be as uniform as possible. To accomplish this while still maintaining proper radial spacing between the overlapped, cylindrical wall portions, the corrugated spacer 53 is formed of a continuous, thin strip disposed with its smaller dimension normal to the direction of air flow such that the air flow is obstructed as little as possible by circumferentially spaced-apart risers 56 extending across the passage 48. The risers 56 are interconnected by arcuate portions 58 and 59 alternately contiguous with the dome 41 and the wall member 36, respectively. It is convenient to refer to the risers 56 as being radial members even though they do have a certain circumferential extent since their function is to extend across the passage 48 and maintain the radial spacing between the overlapped elements 41 and 36. The downstream end of the cowl 43 overlaps the upstream portion of the wall member 36 in contiguous relationship such that the cowl 43 and the upstream wall member 36 actually form an integral wall structure at the joint 30, no passage being formed between these elements.

To maintain the elements comprising the joint 30 in position, every other riser 56 has an opening 60 therein, and aligned openings 61, 62, and 63 are provided in the dome 41, the wall member 36, and the cowl 43, respectively. A rivet 65, or similar fastening device such as a bolt, is inserted radially through the aligned openings and secured to hold the elements in position. To prevent undesired deflection of the risers 56 and consequent reduction of the spacing 54 when securing the elements with the rivets 65, a supplemental spacing sleeve 67 is provided around each rivet 65 for abutting the overlapped portions of the dome 41 and the wall member 36. The length of each spacing sleeve is, of course, the same as that of the desired radial spacing 54.

By circumferentially aligning the fastening rivets 65 with the risers 56, the total obstruction to air flow through the passage 48 is maintained at a practical minimum since the total frontal area as seen by the air stream is the total area of the fastening rivets 65 and their spacing sleeves 67 normal to the direction of flow plus the total area of the risers 56 normal to the direction of flow less the amount of overlap. If the rivets 65 and the risers 56 were not aligned circumferentially, the total area normal to the flow would simply be the sum of the areas of the risers and the fastening devices without the area reduction due to overlap.

Even though the obstruction to air flow is held to a practical minimum, it will occur to those skilled in the art that the risers 56 and the fastening rivets 65 and sleeves 67 unavoidably interfere to a certain extent with air flow through the annular pasage 48. Specifically, these obstructions will cause wake formations and resulting hot spots on the wall member 36 downstream of the joint 30 unless the nonuniform flow is alleviated in a satisfactory manner. To provide alleviation, a wake hole or opening 70 is provided in the wall member 36 immediately downstream of and in circumferential alignment with each pair of aligned rivets 65 and risers 56. A somewhat smaller hole 71 is provided downstream of each riser 56 not having a rivet 65 associated therewith. These holes 70 and 71 admit air from the air space 14 to replenish the air film in the wake region downstream of the obstruction so as to thereby maintain a uniform temperature distribution on the wall downstream of the joint. Another advantage of the present invention will now be apparent; if the rivets 65 were not circumferentially aligned with the risers 56, additional wake holes would be required to provide adequate cooling since the single openings 70 could not serve the wake regions caused by both the rivets 65 and the risers 56. The use of additional wake holes would, however, probably weaken the wall member 36 to an unacceptable extent. As a practical matter, some wake holes would undoubtedly have to be eliminated for mechanical strength reasons in the event that the rivets 65 were not aligned circumferentially with certain ones of the risers 56. The net result, of course, would be undesired hot spots on the wall member 36 downstream of the joint 30.

As illustrated and described, the joint 30 has a rivet 65 and a spacing sleeve 67 associated with every other riser 56 around the entire annular passage 48. It will occur to those skilled in the art that the relative number of rivets and risers depends upon many variables and that in various combustor designs the ratio of rivets to risers may differ significantly. Since, however, the total area of the wake holes 70 and 71 should be maintained as small as possible for mechanical strength reasons, the number of rivets or other fastening means used should be kept as small as possible so that the number of the larger area holes 70 can also be minimized.

The joint 30 as just described is constructed of three wall members—the wall member 36, the dome 41, and the cowl 43—maintained in radially spaced-apart relationship by the annular spacer 53. The present invention is equally applicable to combustion wall joints comprised of two radially spaced-apart wall members, such as the joint 32 illustrated by FIGS. 1 and 5. In the joint 32, the downstream end of one wall member 36 is overlapped by the upstream end of the adjacent downstream wall member 36, and the cylindrically shaped overlapping portions are held in radially spaced-apart relationship by a corrugated spacer 53'. The spacer 53' is in all respects similar to the spacer 53 of FIGS. 1–4, the other joint elements identified in FIG. 5 by primed numerals also being similar to the corresponding elements of FIGS. 1–4. The joint 32 thus defines an annular passage through which cooling air may be supplied in a highly effective manner to provide wall cooling downstream of the joint 32.

The joints 31 and 33 are in all constructional and operative aspects similar to the joints 30 and 32, respectively, except that in the joints 31 and 33 the downstream ends of the upstream wall members must overlap the upstream ends of the downstream wall members in order to provide annular passages which communicate with the air space 14 at their upstream ends and the combustion space 13 at their downstream ends.

The present invention has been described in conjunction with an annular combustor 11 of a gas turbine engine 10. It will be readily apparent that the invention has general utility with respect to combustors having louvered walls, including, but not limited to, cannular combustors.

It will thus be appreciated that the unique joint construction of this invention provides highly effective cooling both at the joint and on the combustion wall downstream of the joint. In addition, by using rivets or other removable fastening means such as bolts, the entire assembly can be easily disassembled for repair or replacement of defective parts. The joint construction thus provides long and reliable operation due to effective cooling and simple and low cost construction and maintenance due to its mechanical structure.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In combustion apparatus, combustion wall means for separating and at least partially defining a combustion space and an air space, said combustion wall means including a joint construction comprising:
   a first wall member,
   a second wall member overlapping said first wall member,
   spacing means between the overlapped portions of said first and second wall members to maintain said wall member in spaced-apart relationship and thereby form a passage having an upstream end communicating with said air space and a downstream end communicating with said combustion space, said spacing means comprising a plurality of spaced-apart elements extending across said passage, and
   fastening means extending across said passage to secure said wall members and said spacing means into an integral structure, said fastening means comprising a plurality of spaced-apart members extending across said passage, with
   each said fastening member being positioned with respect to at least one said spacing element so as to be in a substantially common linear path of air flow through said passage.

2. The combustion wall means of claim 1 further characterized in that said first and second wall members are generally circular and said spacing elements include:
   a plurality of circumferentially spaced risers extending between said first and second wall members within said passage, each said riser having a circumferential component and a radial component, with at least alternating ones of said risers formed with a generally radially directed aperture therethrough, and
   a plurality of spacing sleeves, each said sleeve extending substantially radially between said first and second wall members and projecting through a respective one of said riser apertures.

3. The combustion wall means of claim 2 further characterized in that each spacing sleeve is formed with a passage extending between said wall members, with each said fastening member extending between said wall members through a respective one of said sleeve passages.

4. The combustion wall means of claim 2 further characterized in that said risers are formed by at least one corrugated member having arcuate portions which are alternately contiguous with said first and second wall members and which interconnect adjacent ones of said risers.

5. In combustion apparatus, combustion wall means for separating and at least partially defining a combustion space and an air space, said combustion wall means including a joint construction comprising:
   a first wall member,
   a second wall member overlapping said first wall member,
   the overlapped portions of said wall members being of generally cylindrical configuration,
   a continuous corrugated member disposed between the overlapped portions of said wall members to maintain said wall members in radially spaced-apart relationship with respect to the axes of said overlapped portions and to form with said overlapped portions a passage of annular cross-section, said passage having an upstream end communicating with said air space and a downstream end communicating with said combustion space such that air may be supplied therethrough to said combustion space,
   said corrugated members comprising a plurality of circumferentially spaced-apart portions extending across said passage between said wall members in a direction having a substantial radial component and a plurality of arcuate portions interconnecting adjacent ones of said radial portions such that said corrugated member is alternately contiguous with said first and second members,
   and a plurality of removable fastening members extending radially across said passage to secure said wall members and said corrugated members into an integral structure,
   each of said fastening members being circumferentially positioned with a respective one of the radial portions of said corrugated member so as to be in a common linear path of air flow and thus provide minimum interference to air flow through said passage.

6. The combustion wall means of claim 5 further characterized by and including an extension of said second wall member extending upstream of said passage, said upstream extension dividing said air space into a first portion between said first wall member and said upstream extension and a second portion, with the upstream end of said passage communicating with said first portion of said air space.

7. Combustion wall means as defined by claim 5 in which the radial portion of each aligned pair of fastening members and radial portions of said corrugated member has an opening therein and the fastening member extends radially through said opening.

8. Combustion wall means including a joint construction as defined by claim 5 in which said fastening members are rivets, said joint construction further including a plurality of spacing sleeves each surrounding a respective rivet and abutting said wall members to maintain the radial spacing between said wall members in the vicinity of said rivets.

References Cited

UNITED STATES PATENTS 2,794,319   6/1957   Stockdale _____ 60—39.69 XR
3,307,354   3/1967   Macaulay et al. _____ 60—39.66

JULIUS E. WEST, *Primary Examiner.*